United States Patent
Hedger

[11] Patent Number: 6,021,962
[45] Date of Patent: Feb. 8, 2000

[54] AIR ASSISTED RESIN SPRAY NOZZLE

[75] Inventor: Thomas A. Hedger, Largo, Fla.

[73] Assignee: Graves Spray Supply, Inc, Clearwater, Fla.

[21] Appl. No.: 09/114,575

[22] Filed: Jul. 13, 1998

Related U.S. Application Data

[63] Continuation-in-part of application No. 08/542,943, Oct. 16, 1995, abandoned.

[51] Int. Cl.[7] .................................................. F23D 11/16
[52] U.S. Cl. ................... 239/422; 239/419.3; 239/427.5; 239/428; 239/295; 239/601; 239/290
[58] Field of Search .................................. 239/290, 295, 239/419.3, 422, 427, 427.3, 427.5, 428, 433, 601

[56] References Cited

U.S. PATENT DOCUMENTS

| | | |
|---|---|---|
| 2,610,092 | 9/1952 | Thompson ................ 239/295 |
| 2,614,000 | 10/1952 | Reinhold ................ 239/295 |
| 4,635,852 | 1/1987 | Muhlnickel, Jr. . |
| 4,824,017 | 4/1989 | Mansfield . |
| 4,854,504 | 8/1989 | Hedger, Jr. et al. . |
| 4,967,956 | 11/1990 | Mansfield . |
| 5,046,668 | 9/1991 | Ikeuchi et al. . |
| 5,080,283 | 1/1992 | Kukesh et al. . |
| 5,178,326 | 1/1993 | Kukesh et al. . |

*Primary Examiner*—Andres Kashnikow
*Assistant Examiner*—Steven J. Ganey
*Attorney, Agent, or Firm*—Larson & Larson, P.A.; James E. Larson

[57] ABSTRACT

Spray equipment is used to apply fiberglass reinforced plastics onto mold surfaces. Such spray equipment includes a nozzle designed to allow flow of resin to a point of application as well as an outlet dispenser of small cut pieces of glass which aims the glass into the resin flow so that the resin and glass mix beyond the nozzle exit. A second nozzle is positioned below the resin nozzle and is angled slightly upwardly at the resin stream in the form of an air knife. The air knife causes the resin stream to uniformly spread permitting the chopped glass to fall within the resin stream and uniformly mixed therewithin for application to a mold surface.

19 Claims, 5 Drawing Sheets

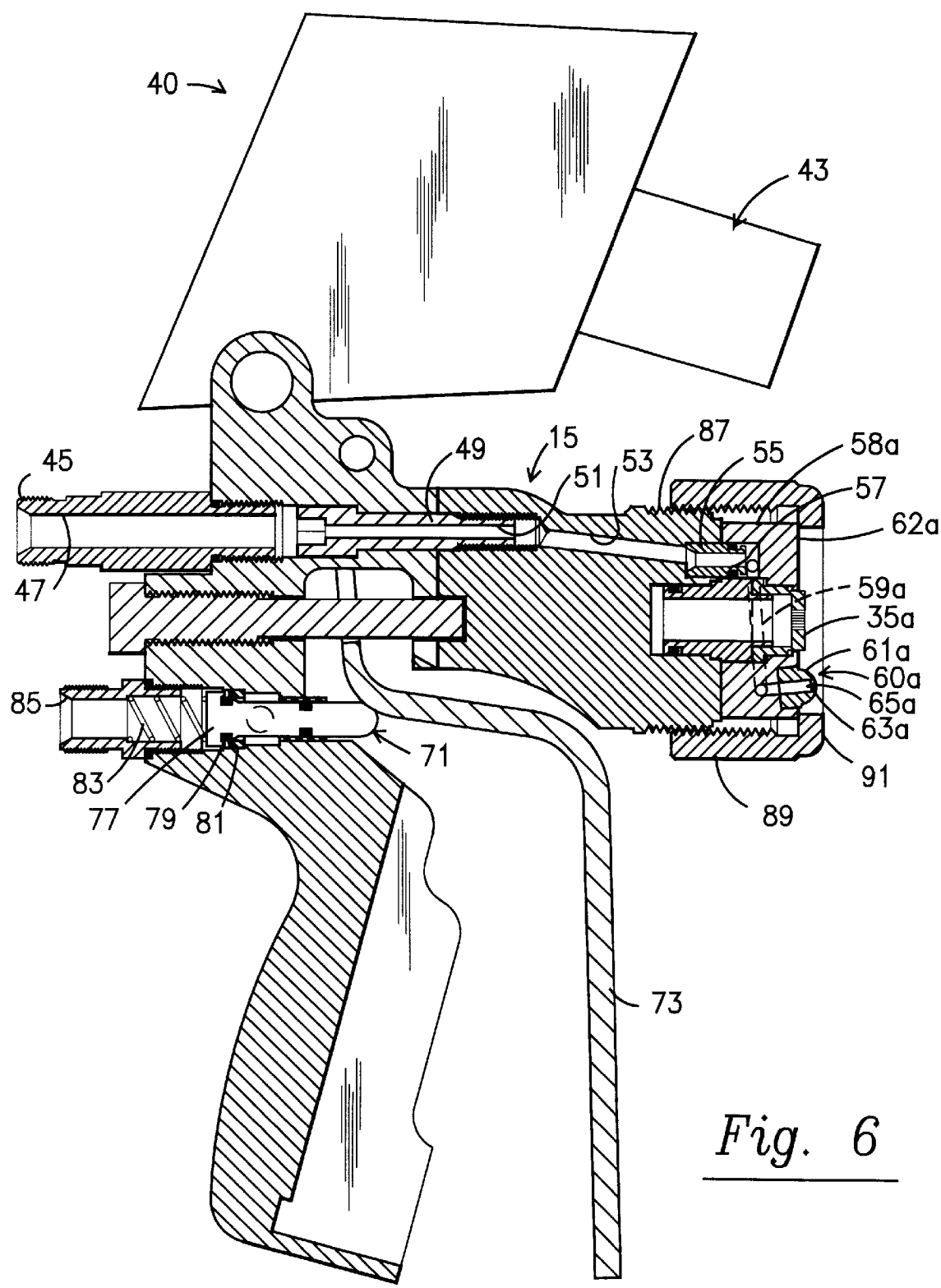

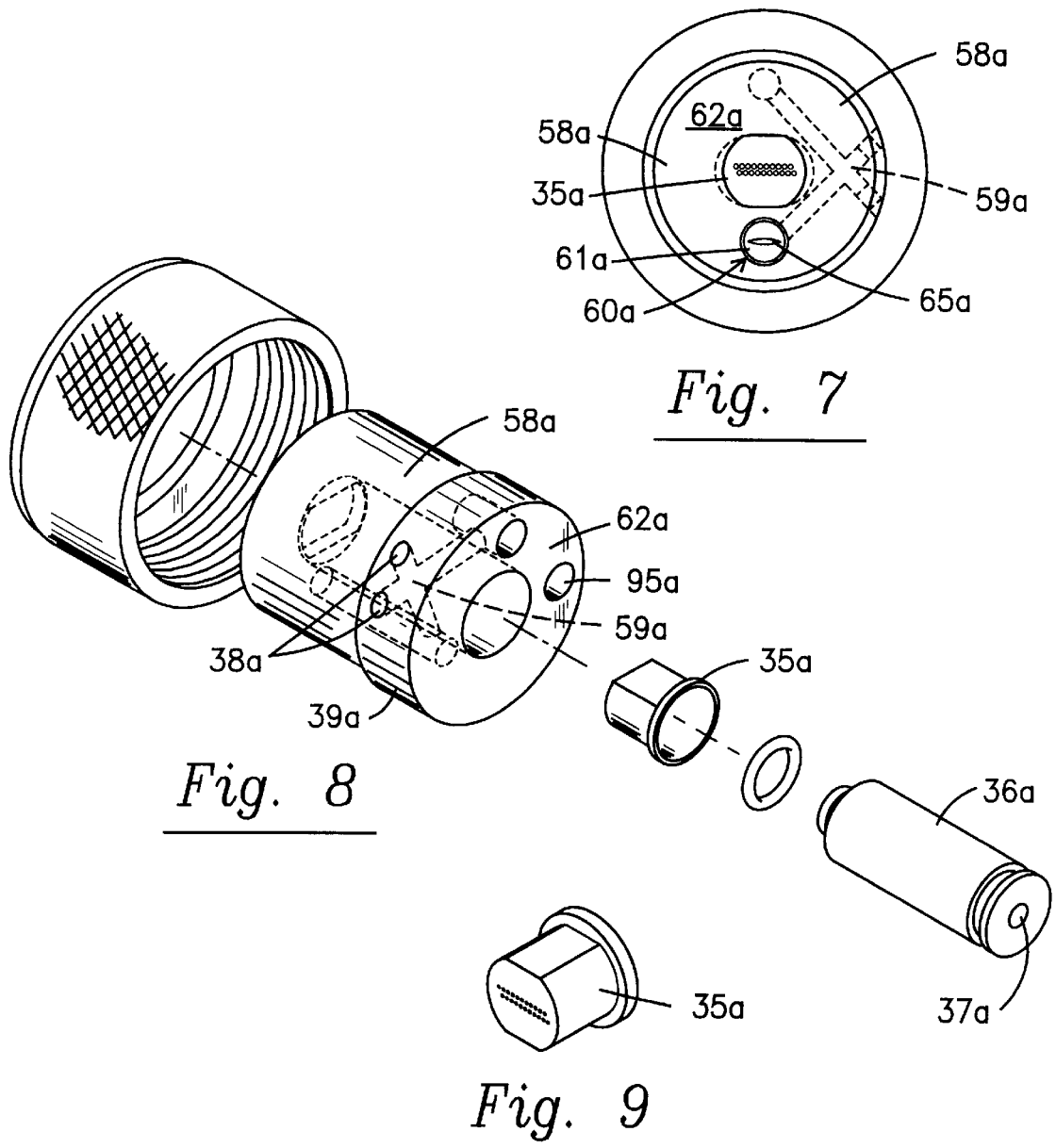

AIR ASSISTED RESIN SPRAY NOZZLE

PRIOR APPLICATIONS

This application is a continuation-in-part of application Ser. No. 08/542,943, filed on Oct. 16, 1995, now abandoned.

BACKGROUND OF THE INVENTION

1. Field of Invention

This invention relates to nozzles for spraying a resin. More particularly, it refers to a nozzle containing an air assist for reducing resin loss between the nozzle and a mold surface and providing for a more evenly spread mixture of resin and glass on the mold surface.

2. Description of the Prior Art

Recently, the fiberglass reinforced plastics (FRP) industry has come under close scrutiny of local, state and federal officials concerning emissions of volatile organic compounds (VOCs), including but not limited to emission of evaporated Styrene. As is well known, Styrene is a major component in the polyester resin that is widely used throughout the FRP industry and, in most resin applications, Styrene may encompass as much as 45%, by volume, of the entire polyester resin formula.

In the FRP industry, it has become customary to apply fiberglass reinforced plastics using spray equipment to apply the resin to mold surfaces. Examples of products manufactured in this manner include showers and bathtubs, boat hulls, recreational vehicles and various construction materials. As a volatile organic compound, Styrene will gradually evaporate from an open container without outside stimulus. When a resin mixture including Styrene is sprayed, the rate of evaporation drastically increases. Recent studies sponsored by the Environmental Protection Agency have shown that when a resin containing Styrene is sprayed, especially in the "lay-up" process, it can emit as much as 22 to 23% of its total Styrene content in the form of evaporation. As such, in an effort to reduce such emissions in the workplace, which may be damaging to the health of workers and to the public in general, the FRP industry needs to take steps to reduce such emissions.

Customarily, when fiberglass reinforced plastic products are manufactured, the resin is sprayed and chopped fiberglass is introduced into the spray pattern of resin beyond the resin nozzle so that a resin/glass matrix is deposited on the mold surfaces. As is known, the fiberglass addition is a critical part of the application because it provides the necessary reinforcement to build the fiberglass part. Spray guns have been developed which combine dispensing of resin with mixing, therein, of chopped fiberglass beyond the resin nozzle. Such a gun, known in the art as a "chopper gun" has greatly advanced the speed and efficiency with which FRP parts are manufactured.

When the resin is atomized into fine droplets by the dispensing nozzle, the surface area of the resin that is exposed to the atmosphere is greatly increased and, correspondingly, evaporative Styrene loss greatly increases as well. To solve this problem, chopper guns are now manufactured incorporating a nozzle referred to as a "FLOCOATER". Such a "FLOCOATER" nozzle is specifically designed with a multiplicity of small holes having diameters in the range of 0.010 to 0.035 inches and arranged in a desired pattern. Such a nozzle projects resin out of these holes in a showering or sprinkling fashion rather than in a spraying fashion. Use of a "FLOCOATER" nozzle reduces evaporative loss of Styrene to as low as 4 to 5%, by volume, thereof. This reduction is a great improvement over the prior art.

However, while the use of a "FLOCOATER" nozzle greatly reduces Styrene emissions, chopper guns employing "FLOCOATER" nozzles have not yet been perfected because the chopped fiberglass is not uniformly distributed within the resin stream beyond the resin nozzle. This non-uniform distribution of chopped fiberglass in the resin stream results in a non-uniformity of distribution of the fiberglass within the resin as deposited on the mold surfaces. The resulting laminate formed from the non-uniform distribution of chopped fiberglass suffers significant loss of physical strengths, especially in the flexural and tensile areas. Additionally, if the fiberglass does not distribute evenly throughout the spray pattern, "dry spots" (a lack of glass saturation) can be formed on the mold surface. Such results are unacceptable, causing the part or product to be rejected, thereby causing economic waste.

Other problems exist as well. The required velocity of the fiberglass dispensed from the source thereof, as attached to the chopper gun, causes as much as 30% or more of the chopped fiberglass to simply fall through the resin stream and wind up on the adjacent floor surface as waste material. This is a result of the fiberglass falling through small gaps between the resin streams inherent with the emerging stream pattern. Such waste can be an environmental hazard as well as cause significant economic waste.

As such, a need has developed for a new chopper gun design permitting uniform distribution of chopped fiberglass within the resin stream while reducing wastage of chopped fiberglass.

The following prior art is known to Applicant:

U.S. Pat. No. 4,635,852 to Muhlnickel, Jr.;

U.S. Pat. No. 4,824,017 to Mansfield;

U.S. Pat. No. 4,854,504 to Hedger, Jr. et al.;

U.S. Pat. No. 4,967,956 to Mansfield;

U.S. Pat. No. 5,046,668 to Ikeuchi et al.;

U.S. Pat. No. 5,080,283 to Kukesh et al.; and

U.S. Pat. No. 5,178,326 to Kukesh et al.

Although some references in the prior art teach the use of an air stream, they show the air stream positioned parallel to the resin streams. When the air stream is introduced in this manner, between the resin stream and the falling chopped fiberglass, additional problems are created. For instance, the air stream actually carries and blows the chopped fiberglass downstream, prohibiting the reinforcing fibers to blend within the resin stream. Such is shown in Kukesh et al. '283 wherein the chopped reinforcing fibers do not mix with the resin until both the resin and reinforcing fibers make contact with the substrate to be sprayed (see FIG. 1—Kukesh et al. '283). The present invention differs from the teachings of the prior art as contemplating the use of an air nozzle positioned below the resin nozzle and angled slightly upwardly. The air nozzle is specifically designed to blend the resin streams to promote uniform distribution of chopped fiberglass within the resin stream before the stream reaches the mold surface.

SUMMARY OF THE INVENTION

The present invention relates to an air assisted resin spray nozzle. The present invention includes the following interrelated objects, aspects and features:

(A) The present invention provides a drastic improvement over a conventional "FLOCOATER"-type chopper gun, wherein resin is supplied to an outlet nozzle which, if a "FLOCOATER" configuration is employed, consists of a plurality of small diameter holes, in the range of 0.010 to 0.035 inches in diameter arranged in a pattern and so sized to cause resin to flow therethrough in a manner similar to the operation of a shower or sprinkler rather than that of a spraying device.

(B) The chopper gun also includes a source of chopped fiberglass having an outlet nozzle positioned to spray the chopped fiberglass over the resin flow so that the chopped fiberglass mixes with the resin flow before being deposited on mold surfaces.

(C) An air assist is provided designed to spray an air knife or sheet of air outwardly therefrom intersecting the resin streams at a point forward of the nozzle, blending the streams together to form a uniform spray pattern, thereby permitting chopped reinforcing fibers to fall into the resin streams from an opposed side from that of the air assist, thereby further permitting the reinforcing fibers to blend uniformly within the resin spray.

(D) In the preferred embodiment of the present invention, the air assist consists of a generally elliptical slot located on a generally conical nozzle body that protrudes slightly beyond and below the resin nozzle and is slightly upwardly angled.

As such, it is a first object of the present invention to provide a chopper gun with an air assisted resin spray nozzle.

It is a further object of the present invention to provide such a nozzle located below a resin nozzle, angled slightly upwardly at the resin stream to cause uniform resin stream blending resulting in uniform distribution of chopped fiberglass within the resin flow.

It is a still further object of the present invention to provide such a nozzle with a generally elliptical horizontally elongated shape.

It is a still further object of the present invention to provide such a nozzle with a generally conical outwardly converging nozzle body.

These and other objects, aspects and features of the present invention will be better understood from the following detailed description of the preferred embodiment when read in conjunction with the appended drawing figures.

BRIEF DESCRIPTION OF THE DRAWINGS

The invention may be best understood by those having ordinary skill in the art by reference to the following detailed description when considered in conjunction with the accompanying drawings in which:

FIG. 6 shows a cross-sectional view through a preferred chopper gun in accordance with the teachings of the present invention showing the flow path of air to the air assisted nozzle thereof;

FIG. 7 shows a front view of that portion of the preferred chopper gun including the resin nozzle and air assisted nozzle;

FIG. 8 shows a rear exploded perspective view of the nozzle assembly seen in the front view of FIG. 7; and FIG. 9 shows a perspective view of the spray tip used in the nozzle assembly of FIG. 8.

SPECIFIC DESCRIPTION OF THE PREFERRED EMBODIMENT

Figure 1:
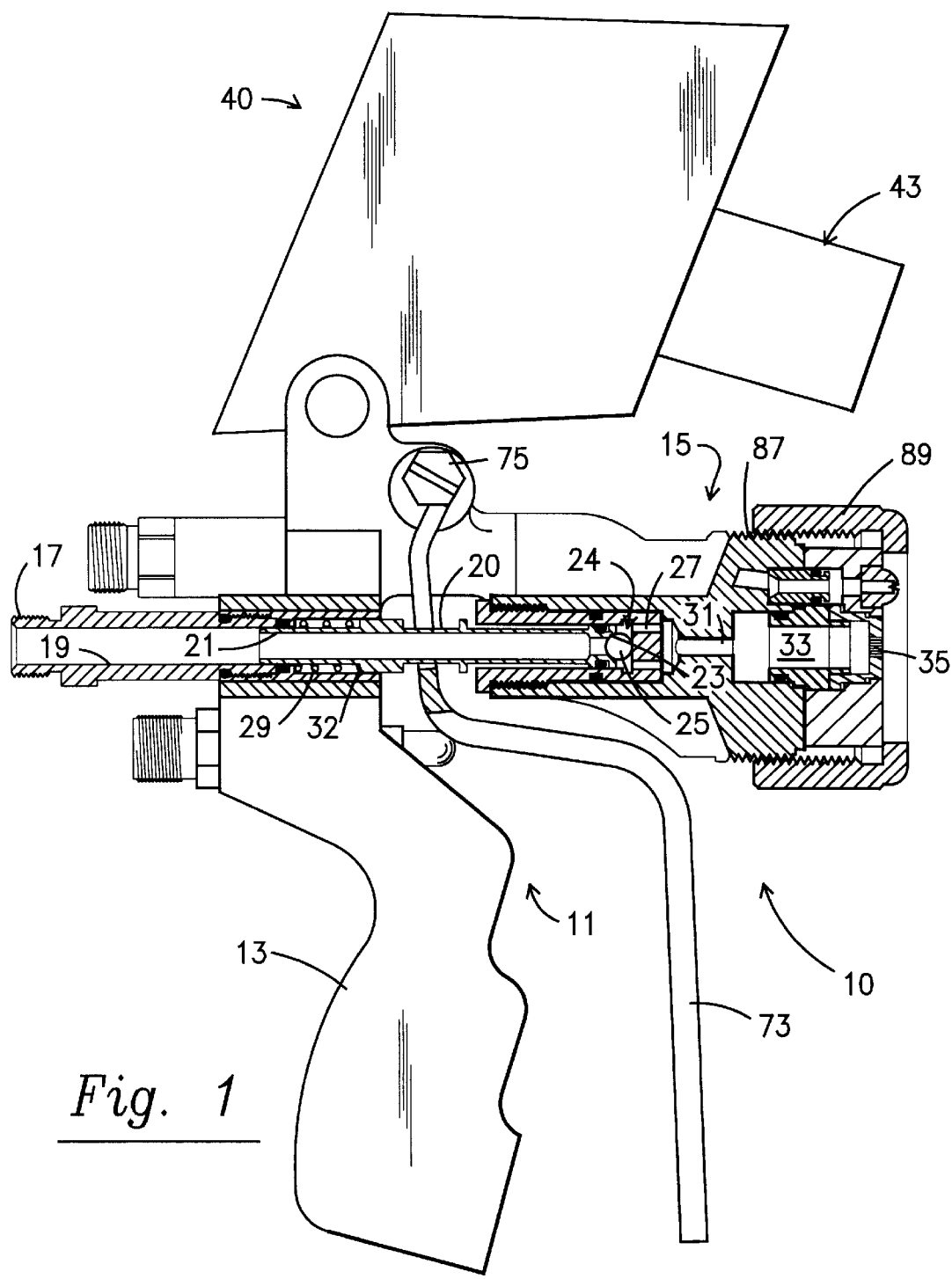
FIG. 1 shows a cross-sectional view through an alternate chopper gun in accordance with the teachings of the present invention showing the resin flow path therethrough.
Figure 2:
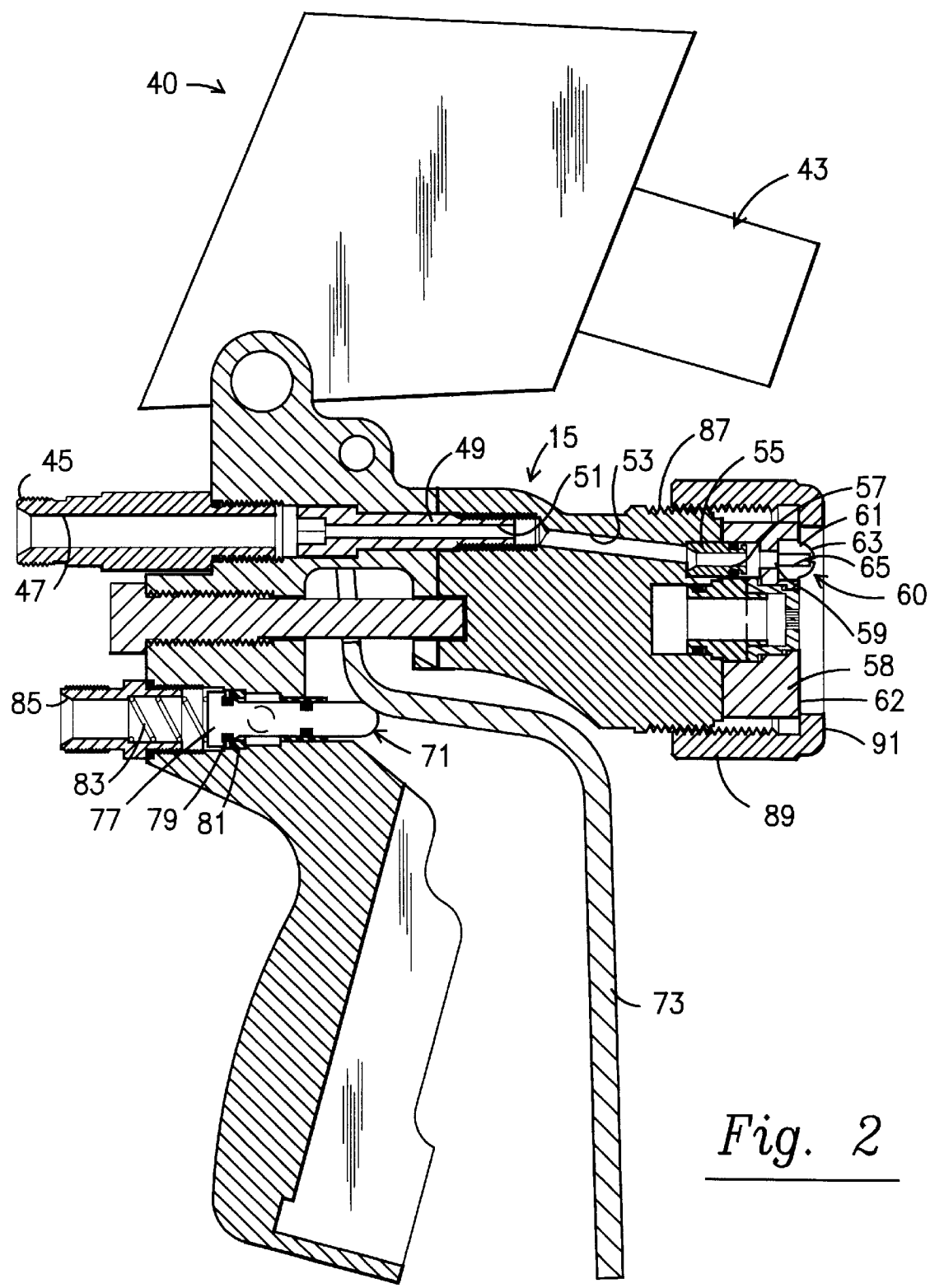
FIG. 2 shows a cross-sectional view through the alternate chopper gun in accordance with the teachings of the present invention showing the flow path of air to the air assisted nozzle thereof.

With reference to FIGS. 1 and 2, a chopper gun applicator is generally designated by the reference numeral 10 and is seen to include a body 11 having a handle 13 to which is connected a gun head 15.

Figure 3:
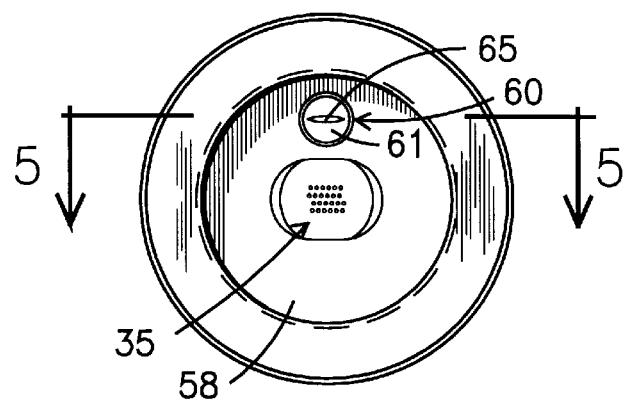
FIG. 3 shows a front view of that portion of the alternate chopper gun including the resin nozzle and air assisted nozzle.

With reference to FIG. 1, gun head 15 has an inlet fitting 17 connectable to a source of resin mixture, which fitting leads to a flow path 19, the distal end of which slidably receives an inlet end 21 of a slidable conduit 20 having an outlet end 23 which comprises a seat for a ball valve 25 contained within a valving chamber 24. The valving chamber 24 leads to outlet passages 27 which comprise a resin mixture diffusor. An annular coil compression spring 29 bears against an annular shoulder 32 of slidable conduit 20 to bias it in the direction of engagement of seat 23 on ball 25 thereby precluding flow of resin therepast. When slidable conduit 20 is moved in the direction of fitting 17 by a suitable actuator (not shown), seat 23 moves away from ball 25 allowing flow of resin through the passageways 27 comprising the resin mixture diffusor. Thereafter, resin flows through an orifice 31 to a first channel 33 and thence through a "FLOCOATER" nozzle 35 which consists of a multiplicity of holes having diameters ranging from 0.010 to 0.035 inches. Usually, nozzle 35 consists of ten or more holes arranged in a pattern such as depicted in FIG. 3.

As also shown in FIGS. 1 and 2, a chopper body 40 is mounted on gun body 11 in any suitable manner and includes an internal chamber (not shown) containing a volume of chopped fiberglass and an outlet nozzle 43 which may be employed, in a manner well known to those skilled in the art, to dispense chopped fiberglass over the stream of resin flowing from "FLOCOATER" nozzle 35.

With particular reference, now, to FIG. 2, an inlet fitting 45 is connectable to a source (not shown) of air pressure. A passageway 47 leads to an air tube 49 having a further passageway 51 therethrough leading to a further passageway 53 terminating at an orifice fitting 55 having an orifice 57 leading to a second channel 59 in a nozzle support 58 on which is mounted an air assisted nozzle 60.

Air assisted nozzle 60 includes a body 61 having a terminus 63 of generally semi-spherical or conical shape protruding beyond a flat outer surface 62 of nozzle support 58. Body 61 has an orifice 65 therethrough which, as best seen with reference to FIG. 3, is generally elliptical in shape and elongated in the horizontal direction. Orifice 65 at its outward terminus preferably has an orifice size of from 0.005 to 0.125 inches with a slot cut into the body 61 to generate an air pattern of 5° to 125°.

With further reference to FIG. 2, a chopper air valve 71 is actuated through pivoting movements of a trigger 73 pivotably mounted to gun body 11 at a connection 75 (FIG. 1). Valve 71 has a valve head 77 including an O-ring 79 that seats on a seat 81 in the closed position thereof to which valve 71 is biased by a spring 83. An inlet fitting 85 is connectable to a source of air pressure and, in a manner well known to those skilled in the art, through operation of trigger 73, pressurized air is applied to chopper body 40 to cause chopped fiberglass to be dispensed from outlet 43.

As best seen with reference to FIGS. 1 and 2, gun head 15 has a forward portion having external threads 87 which threadably receive an internally threaded retainer ring 89 which holds nozzle support 58 in mounted position as shown in FIGS. 1 and 2. Ring 89 has a forward opening 91 allowing free access to nozzle body 61 and "FLOCOATER" nozzle 35.

Figure 4:
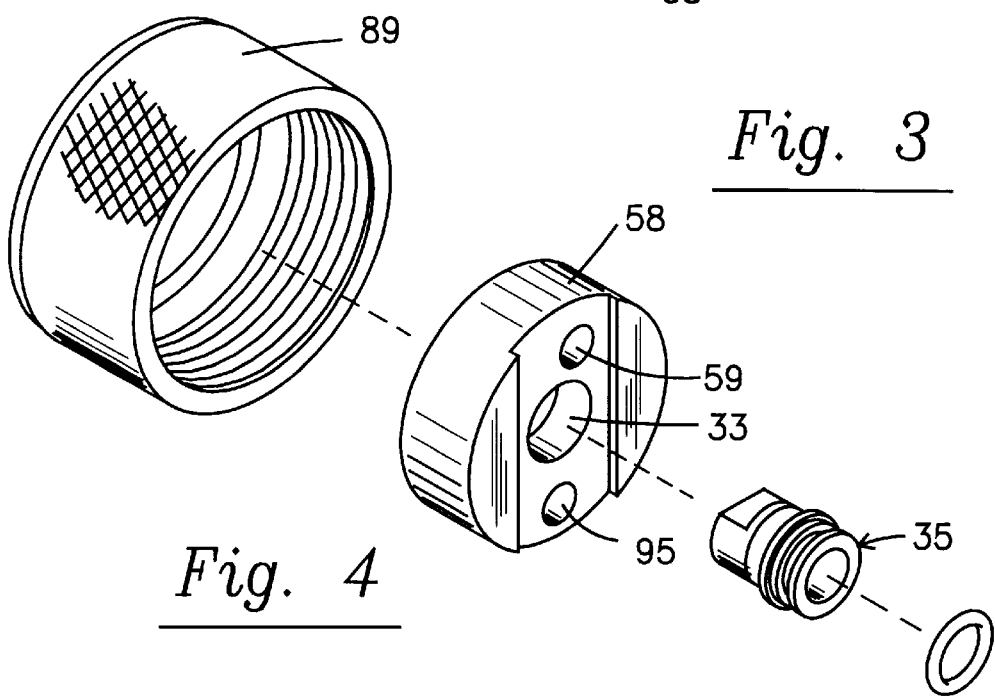
FIG. 4 shows a rear exploded perspective view of the nozzle assembly seen in the front view of FIG. 3.
Figure 5:
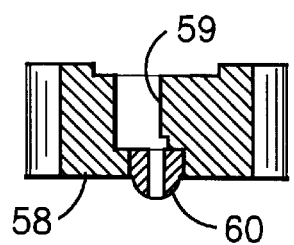
FIG. 5 is a cross sectional view along lines 5—5 of FIG. 3.

FIG. 4 shows nozzle support 58 including first channel 33 and second channel 59 as well as an additional orifice 95 provided as a means to properly align nozzle support 58 on gun head 15. "FLOCOATER" nozzle 35 is also shown as is retainer ring 89 with its internal threads and external knurled surface permitting easy gripping for removal and re-installation. In this embodiment, first channel 33 shown in FIGS. 4 and 5 is centrally located in nozzle support 58. Second channel 59 is above first channel 33 but slightly offset to either the right or left of first channel 33. The exit end of second channel 59 as seen in FIG. 3 is centrally aligned above first channel 33. This offset provides a desirable flow pattern of air from air assisted nozzle 60.

In a preferred embodiment, as seen in FIGS. 6 through 9, with particular reference to FIG. 6, an air assist nozzle 60a is located below a "FLOCOATER" nozzle 35a. A second channel 59a is formed within a nozzle support 58a in a zig-zag route and aligns with an orifice 65a of a body 61a of air assist nozzle 60a. Additionally, air assist nozzle 60a includes a terminus 63a of generally semi-spherical or conical shape protruding beyond a flat outer surface 62a of the nozzle support 58a. An orifice 65a, as best seen with reference to FIG. 7, is generally elliptical in shape and elongated in the horizontal direction. Orifice 65a at its outward terminus preferably has an orifice size of from 0.005 to 0.125 inches with a slot cut into body 61a to generate an air pattern of 5° to 125°.

With reference to FIGS. 8 and 9, "FLOCOATER" nozzle 35a is shown. As seen in FIG. 8, a nozzle tip locator 36a is shown having a locator channel 37a formed therethrough. Locator channel 37a ensures the passage of air from second channel 59a to orifice 65a. With further reference to FIG. 8, a pair of capped channel forming apertures 38a are formed through an outer peripheral edge 39a of nozzle support 58a. Also seen in FIG. 8, is an additional orifice 95a provided as a means to properly align the nozzle support 58a on the gun head 15.

With the above description in mind, operation of the preferred embodiment of the inventive device should be self-evident. As is conventional, slidable conduit 20 is suitably operated to cause flow of resin mixed with catalyst from inlet fitting 17 through passageway 19, through slidable conduit 20, past seat 23 and ball 25, through passageways 27, through orifice 31 into first channel 33 and out "FLOCOATER" nozzle 35a. Concurrently, through operation of trigger 73, valve 71 is opened to allow a flow of air therethrough and thence to chopper body 40 to cause chopped fiberglass to flow out outlet 43 thereof and to spread over the resin-catalyst mixture as it flows out "FLO-COATER" nozzle 35a.

In accordance with the teachings of the present invention, a source of air under pressure of 10 to 100 psi and at a preferred pressure of 40 psi is connected to the fitting 45 thereby allowing a flow of air at a desired pressure and flow rate to travel through passageways 47, 51 and 53 into orifice 57, then second channel 59a and thence out air assist nozzle 60a via the elliptically shaped orifice 65a. As seen in FIG. 6, air assist nozzle 60a is directed at the resin streams flowing from "FLOCOATER" nozzle 35a at a very slight angle. Air assist nozzle 60a produces a sheet of compressed air, similar to an air knife. This small amount of compressed air, blends the resin streams together to form a uniform spray pattern. The width of the air knife is preferably as wide or wider than the pattern of resin streams so that all streams are effectively blended together. As the chopped fiberglass pieces fall upon the resin stream, they are distributed evenly within the blended resin stream pattern. Thereafter the uniformly blended fiberglass-resin mixture is impinged upon the surfaces of the mold being employed in the manufacturing process. In this manner, chopped fiberglass pieces and particles are uniformly distributed within the resin mixture, conveying a complete mixture to the mold surface that has this uniform distribution, whereby the finished article of manufacture has a consistency in density and strength throughout the entire finished article.

In the alternate embodiment, seen in FIGS. 1 and 2, as air flows out of the orifice 65, it spreads in a lateral pattern underneath the falling chopped fiberglass pieces and above the flowing resin. As the chopped fiberglass pieces impinge upon the stream of air flowing from orifice 65, the chopped fiberglass pieces are uniformly distributed and, when they have traveled beyond the effect of the flowing air emanating from orifice 65, they fall upon the resin stream in a uniform manner, the mixture of resin and fiberglass thence impinging upon the surfaces of the mold being employed in the manufacturing process.

If desired, the inventive air assisted spray nozzle may be suitably configured in diverse shapes and configurations. The particular shape and configuration of the air assisted spray nozzle is chosen based upon several factors including the general shape of the distribution of the chopped fiberglass pieces and particles as well as the particular configuration of the stream of resin mixture emanating from "FLO-COATER" nozzle 35a or 35. Thus, for example, air assisted nozzles 60a and 60 may be comprised of a series of adjacent holes instead of an elongated slot. If desired, air assisted nozzles 60a and 60 may include a universal-type mount allowing it to be directionally adjusted, universally, to accommodate different flow nozzle configurations of the "FLOCOATER" nozzle and the chopped fiberglass nozzle.

Air assisted nozzles 60a and 60 are preferably made of a carbide material. Nozzle supports 58a and 58 are made of stainless steel or a high strength aluminum alloy, and nozzles 35a and 35 are made of stainless steel.

As such, an invention has been disclosed in terms of a preferred embodiment thereof which fulfills each and every one of the objects of the invention as set forth hereinabove and provides a new and useful air assisted resin spray nozzle of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. In an applicator for controllably flowing a mixture of liquid resin-catalyst and fiberglass particles onto a mold surface including a source of resin-catalyst and a source of fiberglass particles, the resin-catalyst being dispensed through a first nozzle and the fiberglass particles being dispensed through an outlet located above the first nozzle whereby fiberglass particles dispensed through the outlet fall, under force of gravity, onto a stream of the resin-catalyst dispensed through the first nozzle having a multiplicity of small holes, the improvement comprising a second nozzle having a nozzle housing with a distal end protruding beyond and disposed below the first nozzle and connected to a source of gas, the second nozzle directing a stream of gas upwardly at the stream of resin-catalyst at a slight angle, the fiberglass particles falling onto the stream of resin-catalyst prior to making contact with the mold surface and being substantially uniformly distributed onto the dispensed resin-catalyst and thence onto the mold surface.

2. The applicator of claim 1, wherein the second nozzle has an elongated opening.

3. The applicator of claim 2, wherein the opening is horizontally elongated.

4. The applicator of claim 3, wherein the opening is elliptical.

5. The applicator of claim 4, wherein said elliptical opening has an orifice size of 0.005 to 0.125 inches to generate an air pattern of 5° to 125°.

6. The applicator of claim 1, wherein the distal end of the nozzle housing is conical.

7. The applicator of claim 6, wherein the conical distal end converges in a direction of gas flow.

8. The applicator of claim 1, wherein the gas comprises air.

9. The applicator of claim 1, including a removable cap carrying the first nozzle and second nozzle.

10. The applicator of claim 1, wherein the stream of gas emanating from the second nozzle is at least as wide as the stream of resin-catalyst.

11. A nozzle support for use in an applicator for controllably flowing a liquid resin-catalyst mixture for interaction with a flow of chopped fiberglass particles before making contact with a mold surface, the nozzle support comprising:

a first centrally disposed channel containing a first nozzle having a multiplicity of holes at a distal end for passage of the resin-catalyst mixture, the mixture forming a resin-catalyst stream when exiting the first nozzle;

a second channel adjacent the first channel for conveying a stream of air to a distal end, the distal end containing a cone shaped second nozzle projecting outwardly from the first nozzle and having an elliptical opening for directing an air knife upwardly at the resin-catalyst stream or chopped fiberglass particles from therebelow, and a means for aligning the nozzle support with the applicator.

12. The nozzle support according to claim 11, wherein the multiplicity of holes of the first nozzle distal end have diameters from 0.010 to 0.035 inches.

13. The nozzle support according to claim 11, wherein the first nozzle has at least ten holes at a distal end.

14. The nozzle support according to claim 11, wherein the elliptical opening has an orifice size between 0.005 to 0.125 inches to generate an air pattern of 5° to 125°.

15. The nozzle support according to claim 11, wherein the second nozzle is angled slightly upwardly at the resin-catalyst stream.

16. The nozzle support according to claim 11, further comprising a tip locator for positioning a tip portion of the first nozzle within the nozzle support, the tip locator having a channel formed therein for passing the resin-catalyst mixture from the first channel to the first nozzle distal end.

17. The nozzle support according to claim 11, wherein the second channel is formed through the nozzle support by a zig-zag route.

18. The nozzle support according to claim 11, wherein the means for aligning the nozzle support is an orifice formed on an opposed flat end of the nozzle support from that of the first and second nozzles, the orifice engaging a boss of the applicator.

19. The nozzle support according to claim 11, wherein the air knife is at least as wide as the resin-catalyst stream.

* * * * *